Aug. 19, 1947.  P. L. LOEWE  2,426,108
CYLINDER STRUCTURE
Filed Nov. 23, 1945  2 Sheets-Sheet 1

Inventor
Peter L. Loewe
by Parker & Carter
Attorneys

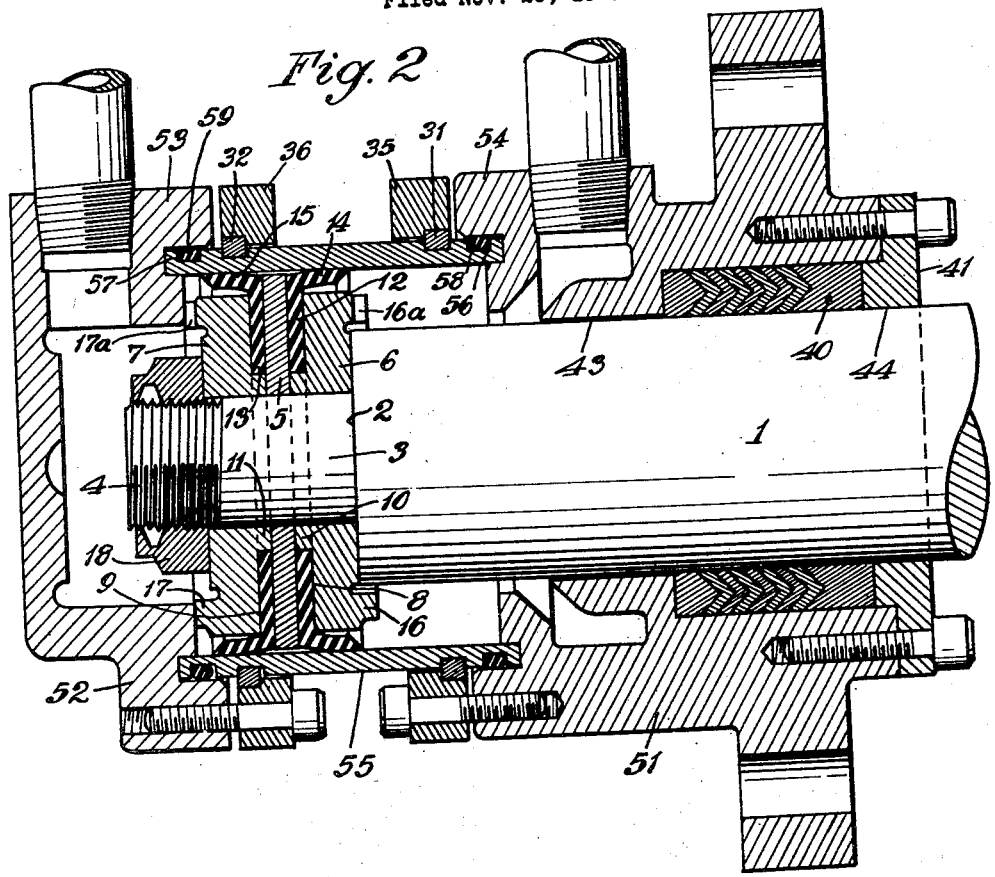
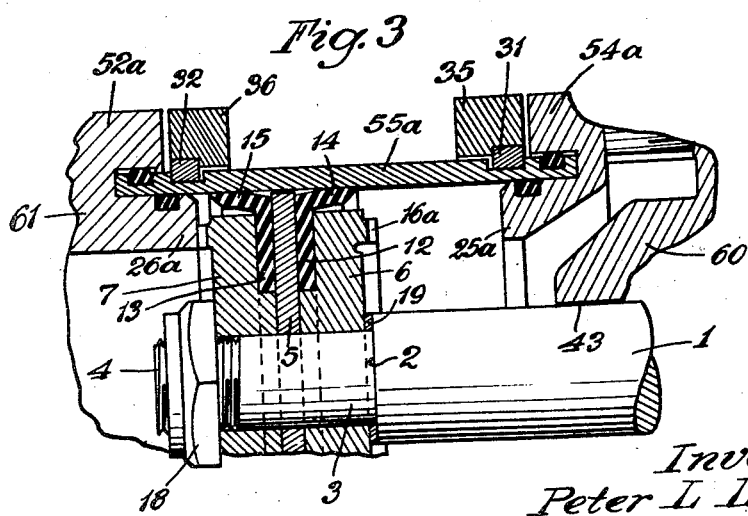

Patented Aug. 19, 1947

2,426,108

UNITED STATES PATENT OFFICE 2,426,108

CYLINDER STRUCTURE

Peter L. Loewe, Chicago, Ill., assignor to
G. F. Goodson, Detroit, Mich.

Application November 23, 1945, Serial No. 630,481

7 Claims. (Cl. 309—2)

This invention relates to an improvement in cylinders and has for one purpose to provide improved assembling and sealing means for a cylinder.

Another purpose is to provide an improved seal for cylinders which does not normally become loosened during the life of a cylinder.

Another purpose is to provide a cylinder construction including leakage preventing means between the cylinder heads and the tubular wall, regardless of whether or not the attaching screws are tight.

Another purpose is to permit substantial variations in the inside diameter of the cylinder tube or wall, while still securing a fluid tight seal.

Another purpose is to permit a wide variation in the length of the completed cylinder, with minimum changes of component parts.

Another purpose is to permit removal of one end cover or cylinder head without affecting the rest of the assembly.

Other purposes will appear from time to time in the course of the specification and claims.

The invention is illustrated more or less diagrammatically in the accompanying drawings wherein:

Figure 2 is an axial section through a variant form;

Figure 3 is a partial axial section through a variant form.

Like parts are indicated by like symbols throughout the specification and drawings.

Figure 1:
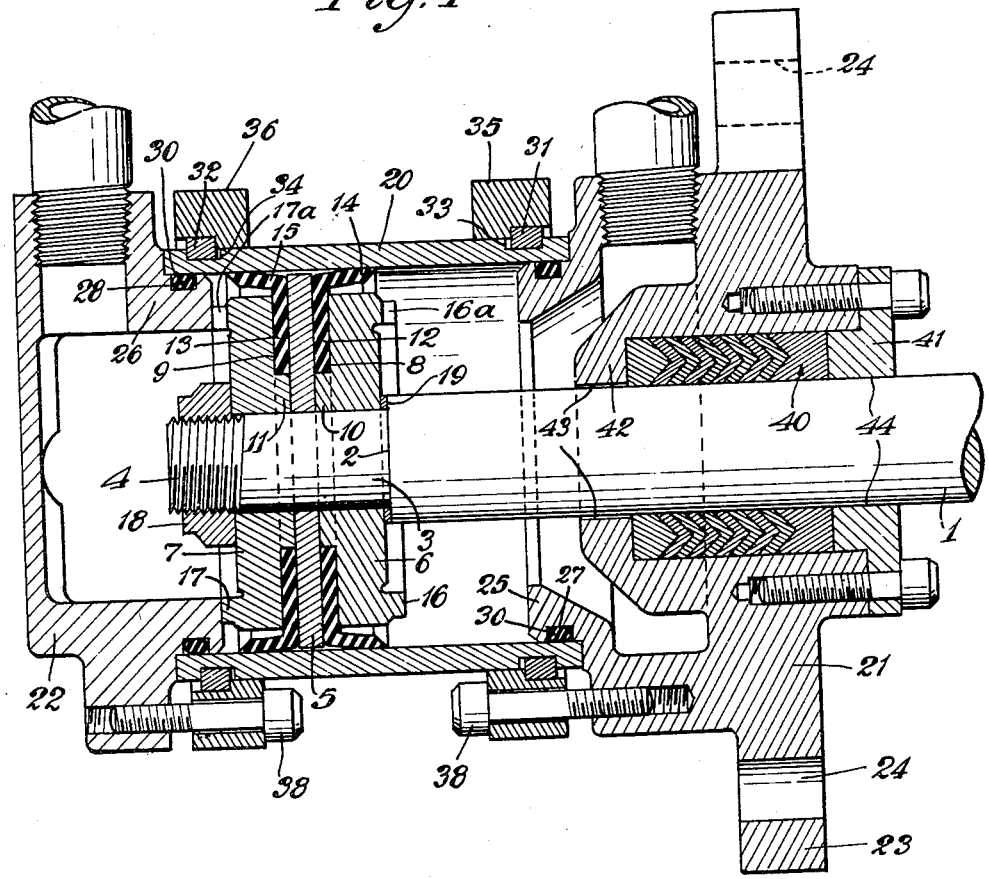
Figure 1 is an axial section through an embodiment of the invention.

Referring to the drawings I generally indicates a piston rod shouldered as at 2 and terminating in a portion of reduced diameter 3, screw threaded as at 4. The piston structure includes a central disc 5, of suitable material, with an external diameter slightly smaller than the internal diameter of the cylinder with which the piston is used. 6, 7 are supporting and clamping rings oppositely recessed as at 8, 9 and having inner annular portions 10, 11 which abut directly against opposite faces of the piston disc 5. Extending into the recesses 8 and 9 are the inner portions of the piston cups 12, 13 of any suitable material, such as a rubber like synthetic. Each such cup includes an outer portion 14, 15 adapted to operate against the inner face of the surrounding cylinder wall. Each of the members 6, 7 has an outer circumferential abutment 16, 17 adapted to serve as a limit member, and broken by grooves 16a, 17a. The piston assembly thus formed may be locked in position by any suitable locking nut or lock nut assembly 18. A packing 19 may be used or omitted, as desired.

The piston structure may be employed with a wide variety of cylinders. I illustrate however a cylinder illustrating a tubular side wall 20 which may be secured to opposite cylinder heads 21, 22. The details and porting of the cylinder heads do not of themselves form part of the present invention. Any suitable means of support for the cylinder structure may be employed. I illustrate for example the integral flange 23 apertured as at 24 to receive any suitable securing member. Referring to the form of Figure 1, the cylinder heads have oppositely extending cylinder penetrating portions 25, 26, each externally channeled as at 27, 28. The external portion is formed to conform to the inner surface of the cylindrical tube 20 which forms the side walls of the cylinder and which bridges the circumferential channels 27 and 28. In each said channel is compressed an annular seal ring 30 of suitable material and cross section, such as a rubber synthetic, having a diameter somewhat greater than the radial separation of the inner face of the cylinder wall 20 from the bottom of the channels. These rings 30 are thus somewhat flattened between the opposed radially separated surfaces and constitute efficient sealing members. The cylinder heads are secured to the cylinder wall 20 individually, by any suitable means. I illustrate for example split rings 31, 32 extending into external channels 33, 34 of the cylinder wall 20, and serving as securing abutments for the nuts or locking rings 35, 36. These may be secured to the cylinder heads by any suitable bolts or securing means 38. I thus provide an independent connection between the cylinder wall 20 and each of the cylinder head or end structures 21, 22.

The cylinder head 21 defines a packing chamber 40 in which any suitable packing structure may be positioned, held under compression by the gland end wall 41. The chamber 40 is defined as at its inner end by an inwardly annular extending or flange member 42 which forms part of and may be integral with the cylinder head, but which is provided with a clearance 43 between it and the piston shaft 1. There may however be a snug fit between the inner bearing surface 44 of the end wall 41 and the piston shaft 1.

Referring to the form of Figure 2, the structure may otherwise be identical save for the proportions of the piston, by the cylinder heads 51, 52 are provided with oppositely extending circumferential flanges 53, 54 having inner cylindrical surfaces adapted to engage the exterior surface of the tubular cylinder side wall 55. This side wall may be exteriorly channeled as at 56, 57 to receive sealing rings 58, 59. The means for securing the cylinder heads to the cylinder wall 55 is shown as the same as in Figure 1.

In the form of Figure 3 I illustrate a variant form of structure in which the cylinder heads 60, 61 have flanges 52a and 54a, corresponding to the flanges of Figure 2, and also inner flanges 25a and 26a corresponding to the flanges 25 and 26 of Figure 1. The formation of the sealing channels and seal rings is the same as in Figures 1 and 2, a double seal thus being provided.

It will be realized that, whereas, I have described and illustrated a practical and operative device, nevertheless many changes may be made in the size, shape, number and disposition of parts without departing from the spirit of the invention. I therefore wish the description and drawings to be taken as in a broad sense illustrative or diagrammatic, rather than as limiting me to my precise showing.

The use and operation of the invention are as follows:

In all forms of the present device the cylinder includes a tubular side wall which may be of uniform diameter from end to end. In all forms it is shown as exteriorly channeled to receive securing split rings 31, 32. In all the forms herein shown each cylinder head is independently secured to the opposed end of the cylinder wall 20 or 55 or 55a. I thus avoid the necesssity of employing securing members which are secured to both cylinder heads. The result is efficiency and economy in assembly and a structure in which one cylinder head can be removed or rotated without affecting the rest of the assembly. There is no endwise thrust on the sealing rings. They are compressed between radially spaced walls but are not under locking compression such as they would receive if they were undergoing the thrust of longitudinally extending securing bolts or screws. The tightness or looseness of the attaching screws does not affect the efficiency of the sealing rings. In the form of Figure 1 I employ sealing rings on the interior of the cylinder side wall, in the form of Figure 2 I employ sealing rings on its exterior, and in the form of Figure 3 I use sealing rings opposed to both the interior and the exterior faces of the cylinder side wall.

The piston structure is adapted to provide a control or predetermination of the thrust against the synthetic cups. The metal part of the piston assembly, including members 5, 6 and 7, is held in a fixed predetermined relationship by the lock nut assembly 18, the three members abutting against each other. The synthetic cups 12, 13 extend into the recesses 8 and 9 and are gripped by a pressure determined by the initial thickness of the cups in relation to the axial width of the recesses in which the inner parts of the cups are gripped. The parts are so proportioned that the desired pressure or endwise thrust is obtained by merely tightening up the lock nut 18 to maintain the parts snugly in the position in which they are shown in the drawings. The periphery of the disc 5 is separated by a small clearance from the opposed inner wall of the cylinder element 20 or 55. Thus it is not necessary to finish the edge of the disc to critical accuracy. The seal between the piston and the inner face of the cylinder wall is obtained by the circumferential flanges 14, 15 of the cups. This permits a variation in relative size of the parts, without a loss of efficiency, and keeps wear of the inner surface of the cylinder wall to a minimum, while compensating for whatever wear takes place.

The piston rod 1, since it is free as at 43 from bearing contact with the portion 42 of the cylinder head, can also adjust itself, to some degree, to minor variations in relative size of the parts. Leakage along the shaft is prevented by the above described packing in the gland space 40. Thus substantial variations in the inside diameter of the tube may occur, while maintaining a fluid tight seal.

If cylinders of different length are desired the structure herein described can be used without change. Since the cylinder heads are individually secured to the cylinder wall all that is necessary is to change the length of the cylinder wall 20 or 55. This can be done without any change of the securing means, since each cylinder head is individually secured to the cylinder wall.

Since there is no bearing contact between the piston 1 and the flange 43 of the cylinder head 21, direct wear being taken by the gland element 41, it is necessary in the event of wear, only to replace the gland element 41.

An advantage of the structure shown is that in the event that fluid penetrates to the space about the sealing rings, it gathers in the corners of the channels in which the rings are positioned and increases the compression on the rings and thus their sealing efficiency.

I claim:

1. In a cylinder adapted for cooperation with a reciprocated piston, a tubular side wall, a separate cylinder head for each end of said side wall and independent means for securing each cylinder head to said side wall, one of said cylinder heads being apertured for the penetration of a piston shaft therethrough, the securing means including a removable member extending circumferentially about the cylinder wall adjacent each end of the cylinder wall, and removable securing connections between each said member and the adjacent cylinder head, and removable means for holding said circumferential members against movement toward the adjacent ends of the cylinder wall.

2. In a cylinder adapted for cooperation with a reciprocated piston, a tubular side wall, a separate cylinder head for each end of said side wall and independent means for securing each cylinder head to said side wall, one of said cylinder heads being apertured for the penetration of a piston shaft therethrough, the securing means including a removable member extending circumferentially about the cylinder wall adjacent each end of the cylinder wall, and removable securing connections between each said member and the adjacent cylinder head, and removable means for holding said circumferential members against movement towards the adjacent ends of the cylinder wall, including split rings interposed between the exterior of the cylinder wall and the interior of the circumferential members, the cylinder wall being recessed to receive said split rings.

3. In a cylinder adapted for cooperation with a reciprocated piston, a tubular side wall, a separate cylinder head for each end of said side wall and independent means for securing each cylinder head to said side wall, one of said cylinder heads being apertured for the penetration of a piston shaft therethrough, the securing means including a removable member extending circumferentially about the cylinder wall adjacent each end of the cylinder wall, and removable securing connections between each said member and the adjacent cylinder head, and removable means for holding said circumferential members against movement toward the adjacent ends of the cylinder wall, including split rings interposed between the exterior of the cylinder wall and the interior of the circumferential members, the cylinder wall being recessed to receive said split rings, the circumferential members, when in holding position, overlying and protecting said split rings.

4. In a cylinder adapted for cooperation with a reciprocating piston, a tubular side wall, a separate cylinder head for each end of said side wall, said cylinder heads and side wall having opposed portions in telescopic relationship, said opposed portions having overlapping side faces, at least one of said overlapping side faces being circumferentially channeled, compressible sealing means in said circumferential channels, of a radial thickness to maintain them compressed between the opposed walls, and means for holding said cylinder heads against axial movement in relation to said tubular side wall, said sealing means being normally subjected only to radial compression.

5. The structure of claim 4 characterized by the employment of circumferential channels and compressible sealing means extending about the exterior surface of the tubular side wall, and opposed to the cylinder heads.

6. The structure of claim 4 characterized by the provision of circumferential channels and compressible sealing means located on said cylinder heads, and opposed to the inner face of said tubular side wall.

7. The structure of claim 4 characterized by the employment of circumferential channels and compressible sealing means extending about the exterior surface of the tubular side wall and opposed to the cylinder heads, and by the further provision of circumferential channels and compressible sealing means located on said cylinder heads, and opposed to the inner face of said tubular wall.

PETER L. LOEWE.

REFERENCES CITED

The following references are of record in the file of this patent:

UNITED STATES PATENTS

| Number | Name | Date |
|---|---|---|
| 2,230,286 | Cotner | Feb. 4, 1941 |
| 2,362,241 | Campbell | Nov. 7, 1944 |
| 1,402,452 | Simpson | Jan. 3, 1922 |
| 1,631,654 | Stoffel | June 7, 1927 |